US010816570B2

(12) United States Patent
Zheng et al.

(10) Patent No.: US 10,816,570 B2
(45) Date of Patent: *Oct. 27, 2020

(54) HEADING CONFIDENCE INTERVAL ESTIMATION

(71) Applicant: Invensense, Inc., San Jose, CA (US)

(72) Inventors: Yuan Zheng, Fremont, CA (US);
Shang-Hung Lin, San Jose, CA (US);
Kerry Keal, Santa Clara, CA (US)

(73) Assignee: Invensense, Inc., San Jose, CA (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/194,411

(22) Filed: Nov. 19, 2018

(65) Prior Publication Data
US 2019/0094264 A1 Mar. 28, 2019

Related U.S. Application Data

(63) Continuation of application No. 13/975,016, filed on Aug. 23, 2013, now Pat. No. 10,132,829.

(60) Provisional application No. 61/783,220, filed on Mar. 14, 2013, provisional application No. 61/780,475, filed on Mar. 13, 2013.

(51) Int. Cl.
*G01P 21/00* (2006.01)
*G01C 25/00* (2006.01)
*G01C 21/16* (2006.01)
*G01C 17/38* (2006.01)
*G01P 15/00* (2006.01)

(52) U.S. Cl.
CPC ............ *G01P 21/00* (2013.01); *G01C 21/165* (2013.01); *G01C 25/005* (2013.01); *G01C 17/38* (2013.01); *G01P 15/00* (2013.01)

(58) Field of Classification Search
CPC ....... G01P 21/00; G01P 15/00; G01C 25/005; G01C 17/38
See application file for complete search history.

(56) References Cited

U.S. PATENT DOCUMENTS

| | | | |
|---|---|---|---|
| 6,636,826 B1 * | 10/2003 | Abe | G01C 19/56 702/151 |
| 7,451,549 B1 * | 11/2008 | Sodhi | G01C 17/38 33/356 |
| 2006/0027404 A1 | 2/2006 | Foxlin | |
| 2007/0030001 A1 | 2/2007 | Brunson | |
| 2007/0032951 A1 | 2/2007 | Tanenhaus | |

(Continued)

FOREIGN PATENT DOCUMENTS

| | | |
|---|---|---|
| CN | 101855517 | 10/2010 |
| WO | WO2002037827 | 5/2002 |

*Primary Examiner* — Mohamed Charioui
*Assistant Examiner* — Jeremy A Delozier
(74) *Attorney, Agent, or Firm* — Haley Guiliano LLP; Joshua Van Hoven; Stefan Osterbur

(57) ABSTRACT

An inertial measurement system is disclosed. The inertial measurement system has an accelerometer processing unit that generates a calibrated accelerometer data. The inertial measurement system further includes a magnetometer processing unit generates a calibrated magnetometer data, and a gyroscope processing unit generates a calibrated gyroscope data. Using the calibrated accelerometer data, the calibrated magnetometer data, and the calibrated gyroscope data, the inertial measurement system generates a heading angle error indicative of the accuracy of the heading angle error.

7 Claims, 6 Drawing Sheets

(56) References Cited

U.S. PATENT DOCUMENTS

| | | |
|---|---|---|
| 2011/0066395 A1 | 3/2011 | Judd |
| 2011/0178708 A1 | 7/2011 | Zhang |
| 2011/0292166 A1* | 12/2011 | Schall .................. G06T 3/4038 348/37 |
| 2012/0083237 A1 | 4/2012 | Fish |
| 2012/0197590 A1 | 8/2012 | Landers |
| 2012/0217958 A1 | 8/2012 | Oka |
| 2013/0002857 A1 | 1/2013 | Kulik |
| 2014/0149062 A1* | 5/2014 | Chandrasekaran .... G01D 18/00 702/104 |

* cited by examiner

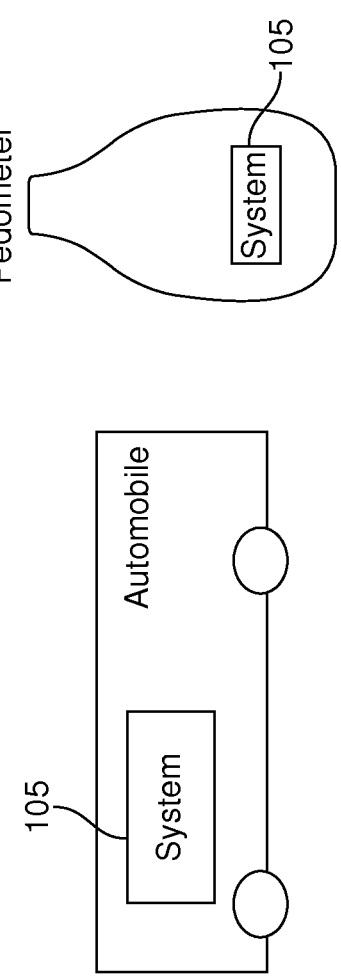
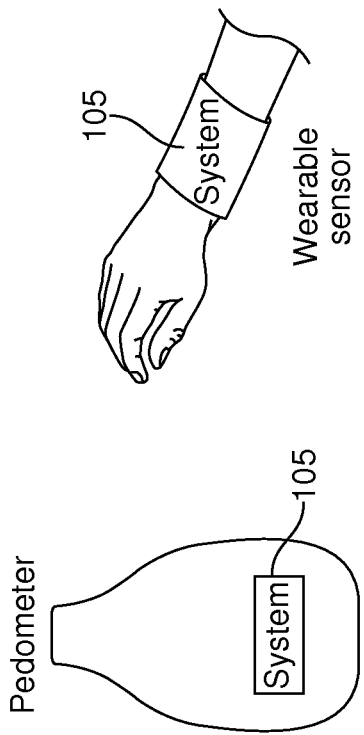
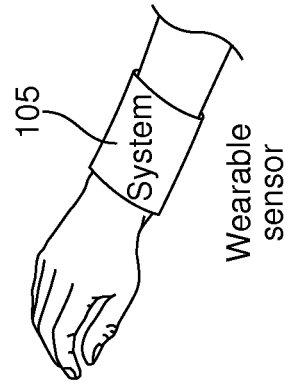
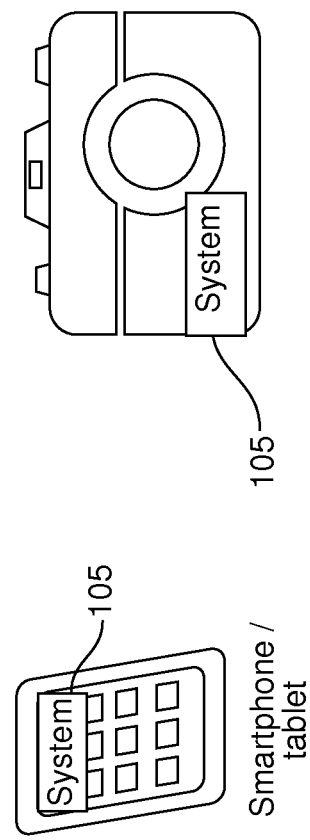
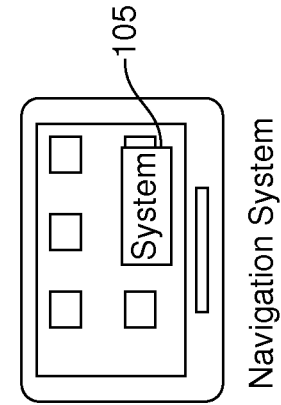

HEADING CONFIDENCE INTERVAL ESTIMATION

CROSS REFERENCE TO RELATED APPLICATIONS

This application claims priority to U.S. Provisional Application No. 61/783,220, titled, "Heading Confidence Interval Estimation", by Zheng, on Mar. 14, 2013 and claims priority to U.S. Provisional Application No. 61/780,475, titled "Heading Confidence Interval Estimation", by Zheng, on Mar. 13, 2013.

BACKGROUND

Various embodiments of the invention relate generally to an inertial measurement system and particularly to measurement of the accuracy of orientation employed in the inertial measurement system.

Motion tracking systems, employed in an inertial measurement system or comprising the inertial measurement system, use motion sensors. Motion sensors are generally a gyroscope, an accelerometer, and a magnetometer sensor. The heading data, or the yaw orientation angle in the world coordinate system, is one of the key outputs from the motion tracking system in applications such as vehicle navigation or handset compass. The heading output is calculated from several motion sensors in the motion tracking system, the motion sensors being as follows: 3-axis gyroscope sensor, 3-axis accelerometer, and 3-axis magnetometer. Each sensor has 3-axis (x, y, z) measurement outputs, which are orthogonal to each other. The 3-axis measurement elements (yaw, roll and pitch) are aligned among the three sensors.

Among the three sensors, the accelerometer data is treated as the reference of the gravity direction (presumably the dominant component of the accelerometer data when the device movement is slow) and the magnetometer is treated as the reference to earth magnetic field direction (assuming no magnetic disturbance). Theoretically, the heading vector, i.e. the vector that points to the magnetic north, can be obtained by projecting the magnetometer data onto the plane that is perpendicular to the gravity vector. In reality, however, since the magnetometer suffers from environmental magnetic disturbance and the accelerometer senses other forms of accelerations together with gravity when the device is in motion, the magnetometer-accelerometer combination often leads to large heading error. Typically, the algorithms used in a sensor fusion, a part of the motion tracking system remedies the disturbance problem by leveraging the gyroscope. The gyroscope is immune to magnetic disturbance and linear acceleration interference when dynamically tracking the orientation change and while using the magnetometer and accelerometer data as the long-term reference to cancel the potential angle drift from the gyroscope imperfection.

Stated differently, motion tracking systems typically use a motion sensor that has distortion. The motion tracking system includes a motion tracking signal that has some uncertainty particularly because the motion tracking system is modeled as a stochastic system. For example, in calculating orientation, an error is calculated because once the error is known, it can be used as a measure of confidence in the calculated orientation. Currently, a rudimentary algorithm is used to calculate an estimate of the angle error. The algorithm is merely a scale of the confidence, such as discrete indicators, 1, 2, 3, and 4, with 1 indicating, for instance, low confidence to 4 indicating the most confidence within plus or minus 5 degrees. This is obviously not a precise estimate of the error. Further, in current systems, an estimate of the error cannot be put in a Kalman filter because an inverse function of a large matrix needs to be calculated thereby making the computation too complex to realize. Thus, there is effectively no error measurement provided in current systems, rather, a description of the error is provided. It is accordingly desirable to more accurately estimate the heading in a motion tracking system.

SUMMARY

Briefly, an embodiment of the invention includes an inertial measurement system with an accelerometer processing unit that generates a calibrated accelerometer data. The inertial measurement system further includes a magnetometer processing unit that generates a calibrated magnetometer data. The inertial measurement system further includes a gyroscope processing unit that generates a calibrated gyroscope data. Using the calibrated accelerometer data, the calibrated magnetometer data, and the calibrated gyroscope data, the inertial measurement system generates a heading angle and an error that is indicative of the accuracy of the angle error.

A further understanding of the nature and the advantages of particular embodiments disclosed herein may be realized by reference of the remaining portions of the specification and the attached drawings.

BRIEF DESCRIPTION OF THE DRAWINGS

FIGS. 2a through 2f show exemplary applications of the system 105, in accordance with various embodiments of the invention.

DETAILED DESCRIPTION OF EMBODIMENTS

In the described embodiments, a motion tracking device also referred to as Motion Processing Unit (MPU) includes at least one sensor in addition to electronic circuits. The sensors, such as the gyroscope, the magnetometer, the accelerometer, microphone, pressure sensors, proximity, ambient light sensor, among others known in the art, are contemplated. Some embodiments include accelerometer, gyroscope, and magnetometer, which each provide a measurement along three axes that are orthogonal relative to each other, referred to as a 9-axis device. Other embodiments may not include all the sensors or may provide measurements along one or more axis. The sensors are formed on a first substrate. Other embodiments may include solid-state sensors or any other type of sensors. The electronic circuit in the motion tracking device receives measurement outputs from the one or more sensors. In some embodiments, the electronic circuit processes the sensor data. While in other embodiments, the sensor data is processed on a processor on a different chip. The electronic circuit is implemented on a second silicon substrate. The first substrate is vertically stacked, attached and electrically connected to the second substrate in a single semiconductor chip.

In the described embodiments, "raw data" refers to measurement outputs from the sensors which are not yet processed. "Motion data" refers to processed sensor data. Processing may include applying a sensor fusion algorithm or applying any other algorithm such as calculating confidence interval. In the case of the sensor fusion algorithm, data from one or more sensors are combined to provide an orientation of the device. In an embodiment, orientation includes heading angle and/or confidence value. In the described embodiments, a MPU may include processors, memory, control logic and sensors among structures. In an embodiment, confidence interval indicates the bounds of the heading uncertainty indicating the error and hence the confidence in the value of the heading estimation. In the described embodiments, predefined reference in world coordinates refers to a coordinate system where one axis of the coordinate system aligns with the earth's gravity, a second axis of the coordinate system coordinate points towards magnetic north and the third coordinate is orthogonal to the first and second coordinates.

Figure 1:
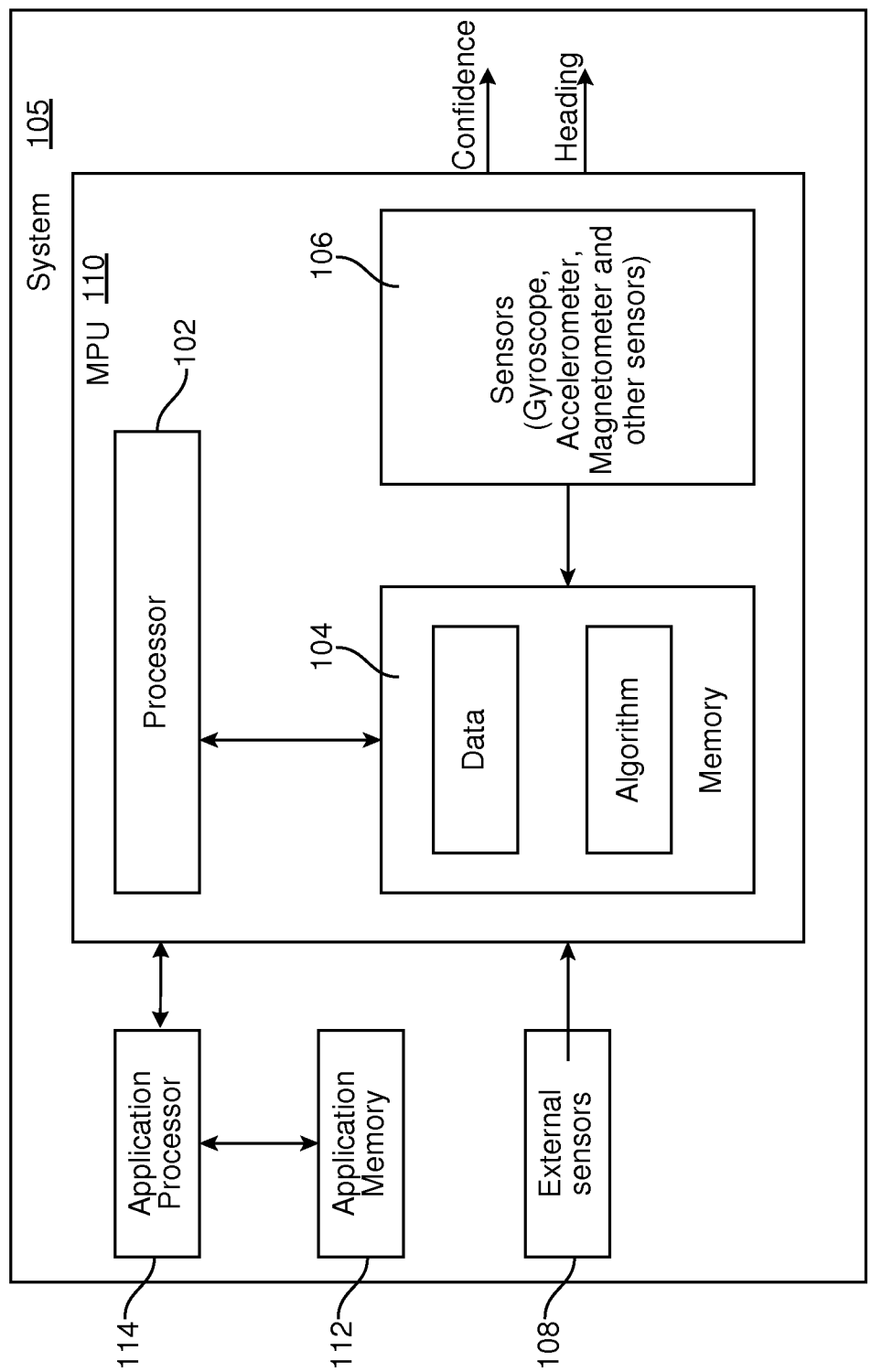
FIG. 1 shows a motion tracking system 105, in accordance with an embodiment of the invention.

FIG. 1 shows a motion tracking system 105, in accordance with an embodiment of the invention. The system 105 is shown to include a MPU 110, an application processor 114, an application memory 112, and external sensors 108. In an embodiment, MPU 110 includes processor 102, memory 104, and sensors 106. The memory 104 is shown to store algorithm, raw data and/or processed sensor data from the sensors 106 and/or the external sensors 108. In an embodiment, sensors 106 includes accelerometer, gyroscope, magnetometer, pressure sensor, microphone and other sensors. External sensors 108 may include accelerometer, gyroscope, magnetometer, pressure sensor, microphone, proximity, haptic sensor, and ambient light sensor among others sensors.

In some embodiments, processor 102, memory 104 and sensors 106 are formed on different chips and in other embodiments processor 102, memory 104 and sensors 106 reside on the same chip. In yet other embodiments, a sensor fusion algorithm that is employed in calculating the orientation is performed externally to the processor 102 and MPU 110. In still other embodiments, the sensor fusion and confidence interval is determined by MPU 110.

In an embodiment, the processor 102 executes code, according to the algorithm in the memory 104, to process the data in the memory 104. In another embodiment, the application processor sends to or retrieves from application memory 112 and is coupled to the processor 102. The processor 102 executes the algorithm in the memory 104 in accordance with the application in the processor 114. Examples of applications are as follows: a navigation system, compass accuracy, remote control, 3-dimensional camera, industrial automation, or any other motion tracking application. In the case of the 3-dimensional application, a bias error or sensitivity error is estimated, by the processor 102. It is understood that this is not an exhaustive list of applications and that others are contemplated.

FIGS. 2a through 2f show exemplary applications of the system 105, in accordance with various embodiments of the invention. FIG. 2a shows an automobile including the system 105. The system 105 calculates the orientation of the automobile to output a heading and a confidence interval. Similarly, in FIG. 2b, a pedometer is shown to include the system 105 for calculating the orientation of the pedometer. FIG. 2c shows a wearable sensor on a user's wrist with the wearable sensor employing the system 105. In some embodiments, the wearable sensor can be worn on any part of the body. System 105 calculates the orientation of the wearable sensor. In FIG. 2d, a smartphone/tablet is shown to employ the system 105. The system 105 calculates the orientation, such as for global positioning applications, of the smartphone/tablet. FIG. 2e shows a 3-dimensional camera employing the system 105 for calculating the orientation of the camera. FIG. 2f shows a navigation system employing the system 105 for calculating the orientation of the navigation system. It is understood that the applications of FIGS. 2a-2f are merely examples of a list of others that is too exhaustive to enumerate.

Figure 3A:
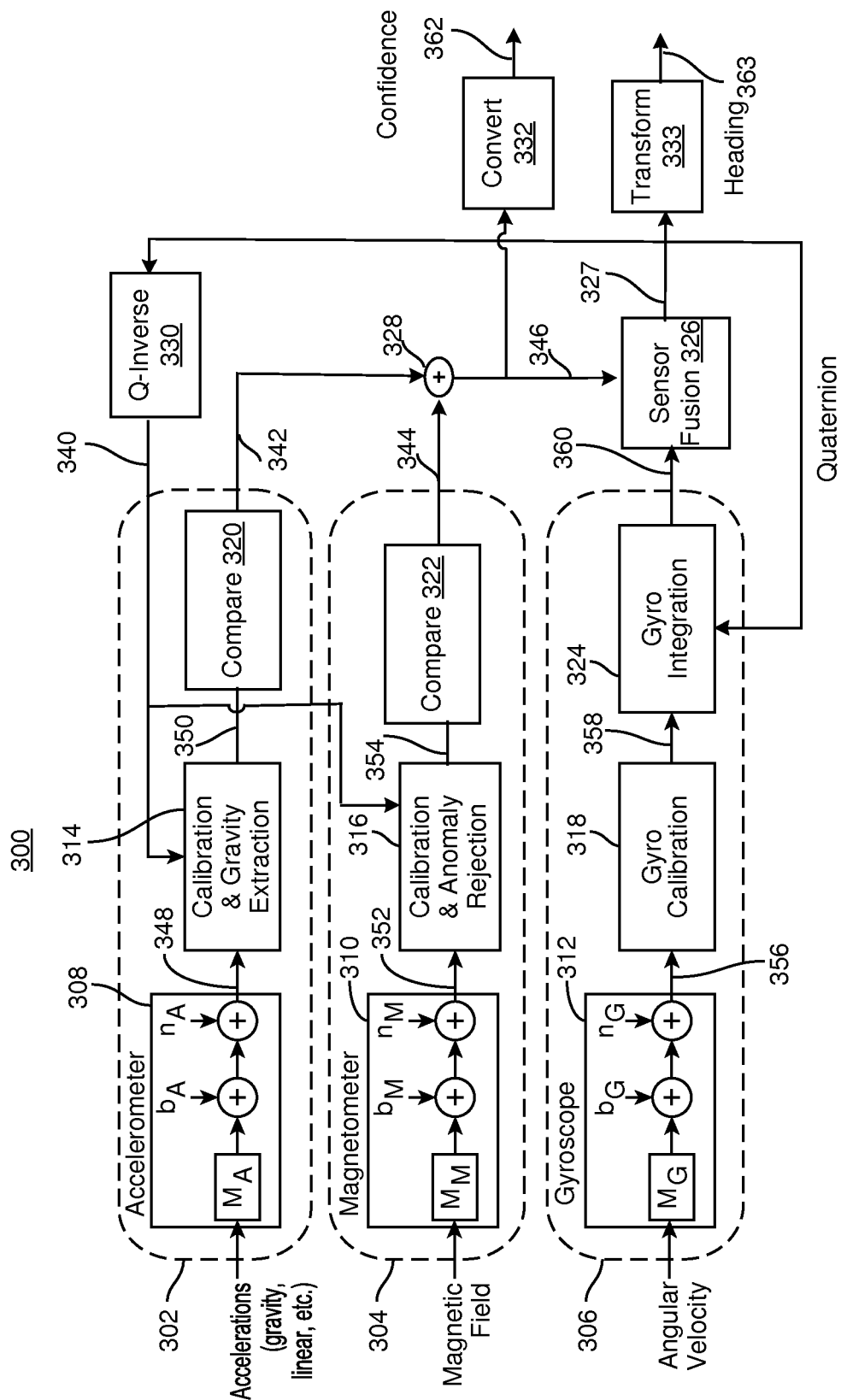
FIG. 3a shows a block diagram of the relevant features of the motion processing unit, in accordance with an embodiment of the invention.

FIG. 3a shows a block diagram of the relevant features of the MPU 300 with heading and the confidence interval which is also defined as the bounds of the heading error, in accordance with an embodiment of the invention. The MPU 300 is analogous to the MPU 110 of FIG. 1.

In FIG. 3a, the MPU 300 is shown to include an accelerometer processing unit 302, a magnetometer processing unit 304, a gyroscope processing unit 306, Q-Inverse block 330, summer 328, sensor fusion 326, transform 333, and converter 332.

The accelerometer processing unit 302 is shown to include an accelerometer sensor 308 that is responsive to acceleration and generates an accelerometer output 348. The accelerometer sensor 308 is shown to include $M_A$ accelerometer, bias, denoted by "$b_A$" and noise, denoted by "$n_A$" that are both introduced in the accelerometer sensing and that are clearly undesirable. The accelerometer processing unit 302 is further shown to have a calibration and gravity extraction block 314 and a comparator 320. Accelerometer output 348 serves as input to calibration and gravity extraction block 314, which further receives input from Q-Inverse block 330. The calibration and gravity extraction block 314 generates a calibrated accelerometer data 350 in world coordinates (also known herein as the calibrated accelerometer output 350) that is used by the comparator 320. The comparator 320 compares the calibrated accelerometer output 350 to predefined reference in world coordinates (shown as the output 340 in FIG. 3a), and generates the comparator output Delta_A, 342.

The magnetometer processing unit 304 is shown to include a magnetometer 310, a calibration and anomaly rejection block 316, and a comparator 322. The magnetometer 310 is shown to receive a magnetic field and to generate a magnetometer output 352. The magnetometer sensor 310 is shown to include $M_M$ magnetometer, bias, denoted by "$b_M$" and noise, denoted by "$n_M$" that are both introduced in the magnetometer sensing and that are clearly undesirable.

The magnetometer output 352 serves as input to the calibration and anomaly rejection block 316. The calibration and anomaly rejection block 316 also receives input from Q-Inverse block 330 which in turn generates the calibrated magnetometer data 354 in world coordinates. The comparator 322 compares the calibrated magnetometer output 354 to the predefined reference in world coordinates and generates the difference Delta_M, 344, which serves as input to the summer 328. The outputs 344 and 342 are added together by the summer 328 and the result of the summation AM 346 is provided as one of the inputs of the sensor fusion 326.

The gyroscope processing unit 306 is shown to include a gyroscope 312, a gyroscope calibration block 318, and a gyroscope integration block 324. The gyroscope sensor 312 is shown to include $M_G$ gyroscope, bias, denoted by "$b_G$" and noise, denoted by "$n_G$" that are both introduced in gyroscope sensor and that are clearly undesirable. The gyroscope 312 is shown to receive an angular velocity and generate a gyroscope output 356. The gyroscope output 356 serves as input to the gyroscope calibration block 318, which in turn generates the calibrated gyroscope data 358 (also known herein as the calibrated gyroscope output 358). The output 358 serves as input to the gyroscope integration block 324, which generates gyroscope quaternion data 360 serving as one of the inputs of the sensor fusion 326. Sensor fusion 326 combines the summation AM 346 and gyroscope quaternion data 360 to generate a motion data 327 in quaternion form. Transform 333 converts the quaternion output to heading 363 which is the angle of motion.

Summer 328 adds Delta_A 342 and Delta_M 344, and the summation AM 346 is converted in convert block 332 to generate the heading confidence interval estimate 362. The output of the sensor fusion which is in quaternion form, is also provided as input to the block 330, which in turn generates an output that is provided to the comparator 320 and the block 314.

The outputs of sensors 348, 352, and 356 represent raw sensor data. The angular velocity and the magnetic field are indicative of the motion whereas the acceleration and the magnetic field are indicative of the tilt.

In some embodiments of the invention, each of the units 302, 304, and 306 is implemented in hardware. In some embodiments of the invention, these units are implemented in software except for $M_A$, $M_M$ and $M_G$. In still other embodiments of the invention, these units are implemented in both hardware and software.

In some embodiments, the units 302, 304, 306, and the remaining components of FIG. 3a reside on the same integrated circuit (or semiconductor). In some embodiments, any combination of the units 302, 304, 306, and the remaining components of FIG. 3a resides on a different integrated circuit than the remaining components.

An inner feedback loop is formed by the output 342, the summation AM 346, sensor fusion 326, quaternion output, q-inverse 330, and compare 320. An outer feedback loop is formed by the quaternion output, the quaternion inverse output 340, the output 354, the output 322, the output 344, summation AM 346, and sensor fusion 326. Accordingly, a dual-loop feedback mechanism, made of the inner feedback loop and the outer feedback loop, is used to detect the imperfection or the mismatch between the gyroscope integration, performed by the block 324, and the accelerometer/magnetometer orientation. The objective of the feedback mechanism is to find and reduce the mismatch.

Each of the blocks 314, 316, and 318 calibrates a respective input. The block 316 detects bias and disturbance. In an embodiment, magnetometer calibration can be implemented as described in U.S. patent application Ser. No. 13/572,441, filed on Aug. 10, 2012, by Kerry Keal, and entitled "Magnetometer Bias And Anomaly Detector", which is incorporated herein by reference as though set forth in full.

Among the three sensors, 308, 310, and 312, the accelerometer data is treated as the reference of the gravity direction (presumably the dominant component of the accelerometer data when the device movement is slow) and the magnetometer as the reference to earth magnetic field direction (assuming no magnetic disturbance). Theoretically the heading vector, i.e. the vector that points to the magnetic north, can be obtained by projecting the magnetometer data onto the plane that is perpendicular to the gravity vector. In reality, however, since the magnetometer suffers from environmental magnetic disturbance and the accelerometer senses other forms of accelerations together with the gravity when the device is in motion, the magnetometer-accelerometer combination often leads to large heading error. Typical sensor fusion algorithms remedy the disturbance problem by leveraging the gyroscope data, which is immune to magnetic disturbance and linear acceleration interference, to dynamically track the orientation change, while using the magnetometer and accelerometer data as the long term reference to cancel the potential angle drift from the gyroscope imperfection.

The output of the convert 332 is an error boundary. The angle error is a measure indicative of the accuracy of the angle. The accuracy of the angle is a measure of the correctness of the angle over an interval of time. An exemplary accuracy of the angle error is confidence interval.

Figure 3B:
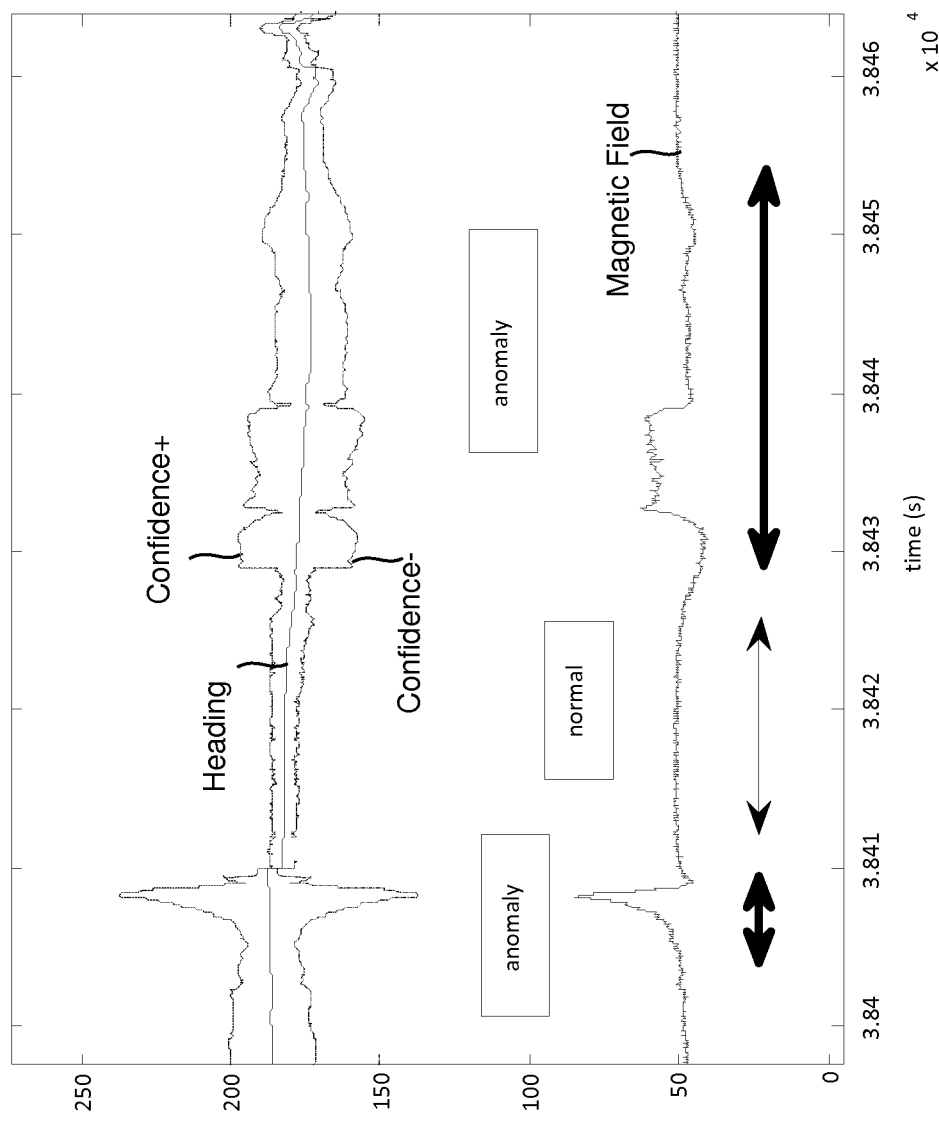
FIG. 3b shows the relationship of the outputs of motion processing unit with varying magnetic field.

FIG. 3b shows a plot of the outputs of MPU 300, heading confidence interval with varying magnetic field strength. The output of transform 333 which is representative of an estimate of the angle shown as heading in FIGS. 3a and 3b. The convert block 332 receives the angle error from summer 328 and generates a confidence interval value shown in FIG. 3b as confidence+ and confidence– indicating the error bounds of heading. FIG. 3b also shows that variation of confidence interval with varying magnetic field.

The feedback loop-based sensor fusion algorithm of FIG. 3a is utilized to estimate the heading from the 3 motion sensors, i.e. the sensors 308, 310, and 312. FIG. 3a shows a dual-loop feedback mechanism employed to detect the mismatch between the gyroscope integration and the accelerometer/magnetometer orientation. The gyroscope integration block 324 generates the angular position (including heading) through the nonlinear integration. The orientation angle from the gyroscope integration block 324 is compared, by the comparators 322 and 320, with the output of the accelerometer and the magnetometer. There is typically a mismatch between the redundant information from different sensors which has the uncertainty bound of the sensor system. One of the objectives of the feedback mechanism is to find and reduce the mismatch.

The gyroscope sensor 312 measures the 3-axis angular velocity. The sensor has imperfectness on sensitivity and bias drift. After gyroscope integration, these sensor uncertainties transfer to the unbounded orientation error. Therefore, the open loop gyroscope integration cannot be used for orientation estimation for a long time and must be corrected by the accelerometer and magnetometer sensors 308 and 310 in the feedback loop.

The 3-axis accelerometer sensor 308 serves to estimate the gravity vector as the inertial reference framework. The sensor has sensitivity, bias and linear acceleration uncertainties. The 3-axis magnetometer sensor 310 serves to estimate the north point vector for heading estimation. The sensor has sensitivity, bias, and uncertainties from magnetic interference.

The uncertainties from accelerometer and magnetometer are handled in the loop (e.g. using gyroscope information to calibrate bias or reject interference), out of loop (e.g. the conventional "figure-8" magnetometer calibration, which only uses magnetometer data to cancel magnetometer bias), or the combination of both. The various embodiments of the invention propose a unified framework to produce confidence interval for all the three architectures.

The angular velocity measurement from the gyroscope sensor is integrated to generate the angular position signal (orientation). This process is a first order nonlinear dynamics, represented as follows:

$$\frac{dq(t)}{dt} = \frac{1}{2}\omega(t)q(t) \quad \text{Equation 1}$$

where $\omega(t)=(0 \; g_x \; g_y \; g_z)$ is the quaternion vector made from gyroscope vector and the multiplication is quaternion multiplication.

For the sample data system, the delta Q can be approximated by $$\Delta Q \cong dq(t) \cdot dt = \frac{1}{2}\omega(t)q(t) \cdot dt \quad \text{Equation 2}$$

Then, the gyroscope-only quaternion integration is as follows:

$$Q_{k+1} = Q_k + \Delta Q_k \quad \text{Equation 3}$$
$$= Q_k + \frac{1}{2}\omega_k Q_k \cdot dt$$

The heading angle can be derived from quaternion through an algebraic formula.

Gyroscope Error Model

A simple model to relate the measured angular rate $\omega_m$ to the real angular rate cis as follows:

$$\omega_m = \omega + b + n_r \quad \text{Equation 4}$$

Where b denotes the gyroscope bias and $n_r$ the rate noise. The rate noise is assumed to be Gaussian white noise with standard deviation $\sigma_r$ (for simplicity, assuming the noise level is equal in all three axes). The gyroscope bias b drifts slowly over time, so it is modeled as a random walk process as follows:

$$b' = n_w \quad \text{Equation 5}$$

where b' is the derivative of b, $n_w$ is zero-mean Gaussian white noise with level $\sigma_w$. The noise characteristics $\sigma_r$ and $\sigma_w$ of a gyroscope can be measured using the Allan Variance technique.

Error Covariance for Gyroscope-Based Quaternion

Based on the gyroscope noise model, an estimate of the error covariance of the integrated quaternion is determined by defining the error state vector as follows:

$$\tilde{x} = \begin{bmatrix} \delta\theta \\ \Delta b \end{bmatrix} \quad \text{Equation 6}$$

where $\delta\theta$ is a 3×1 vector representing the small attitude angle error between the estimated quaternion and the true quaternion. $\Delta b$ is also a 3×1 vector, representing the bias error between true bias and its estimate. The continuous time error state equation can be derived from equation 1 based on the error state vector:

$$\begin{bmatrix} \delta\theta' \\ \Delta b' \end{bmatrix} = \begin{bmatrix} -\lfloor\hat{\omega}\times\rfloor & -I_{3\times 3} \\ 0_{3\times 3} & 0_{3\times 3} \end{bmatrix}\begin{bmatrix} \delta\theta \\ \Delta b \end{bmatrix} + \begin{bmatrix} -I_{3\times 3} & -0_{3\times 3} \\ 0_{3\times 3} & I_{3\times 3} \end{bmatrix}\begin{bmatrix} n_r \\ n_w \end{bmatrix} \quad \text{Equation 7}$$

Where $\lfloor\hat{\omega}\times\rfloor$ is the 3×3 skew-symmetric matrix formed by the estimated angular rate. The noise covariance matrix in this continuous time system is $$Q_c = \begin{bmatrix} N_r & 0_{3\times 3} \\ 0_{3\times 3} & N_w \end{bmatrix} = \begin{bmatrix} \sigma_{r_c}^2 \cdot I_{3\times 3} & 0_{3\times 3} \\ 0_{3\times 3} & \sigma_{w_c}^2 \cdot I_{3\times 3} \end{bmatrix} \quad \text{Equation 8}$$

For discrete time system, the noise covariance matrix can be approximated by the following (assuming the sampling time $\Delta t$ is small):

$$Q_d = \begin{bmatrix} Q_{11} & Q_{12} \\ Q_{12}^T & Q_{22} \end{bmatrix} \quad \text{Equation 9}$$

$$Q_{11} \approx \left(\sigma_r^2 \Delta t + \sigma_w^2 \frac{\Delta t^3}{3}\right) \cdot I_{3\times 3} \quad \text{Equation 10}$$

$$Q_{12} \approx -\sigma_w^2 \left(I_{3\times 3}\frac{\Delta t^2}{2} - \frac{\Delta t^3}{3I} \cdot \lfloor\hat{\omega}\times\rfloor\right) \quad \text{Equation 11}$$

$$Q_{22} = \sigma_w^2 \Delta t \cdot I_{3\times 3} \quad \text{Equation 12}$$

The state error covariance P can then be iteratively estimated at every gyroscope sampling step k by the following equations (with the same assumption that the sampling time $\Delta t$ is small):

$$P = \begin{bmatrix} P_{11} & P_{12} \\ P_{12}^T & P_{22} \end{bmatrix} \quad \text{Equation 13}$$

$$P_{k+1|k} = FP_{k|k}F^T + Q_d \quad \text{Equation 14}$$

$$F = \begin{bmatrix} G & Y \\ 0_{3\times 3} & I_{3\times 3} \end{bmatrix} \quad \text{Equation 15}$$

$$G \approx I_{3\times 3} - \Delta t \lfloor\hat{\omega}\times\rfloor \quad \text{Equation 16}$$

$$Y \approx -I_{3\times 3}\Delta t + \frac{\Delta t^2}{2}\lfloor\hat{\omega}\times\rfloor \quad \text{Equation 17}$$

The 3×3 matrix $P_{11}$ is the error covariance for quaternion estimate, and the 3×3 matrix $P_{22}$ is the error covariance for gyroscope bias estimate. At each gyroscope sampling step k, the sensor noise covariance $Q_d$ is added, so the state error covariance P will increase over time. The square root of the diagonal elements of $P_{11}$ can be used as the confidence interval (1σ) of the gyroscope integration result.

Confidence Interval Update with Out-of-Loop Gyroscope Bias Calibration Algorithm The error covariance (confidence interval) of gyroscope bias is also estimated in the above analysis (i.e., $P_{22}$). In one embodiment the system uses an out-of-loop run-time gyroscope bias calibration algorithm. The gyroscope bias calibration algorithm could zeros out the gyroscope bias when the device is stationary. When this type of gyroscope bias calibration algorithm takes place, the bias error covariance $P_{22}$ will be reset to $\sigma_g^2 \Delta t \cdot I_{3\times 3}$, where $\sigma_g$ is the confidence interval (in one sigma form) of the calibrated gyroscope data from the gyroscope bias algorithm.

Confidence Interval for 9-Axis Fusion

The sensor fusion system uses accelerometers and/or magnetometers to improve the attitude estimate. The accelerometer data is treated as the reference of the gravity direction (presumably the dominant component of the accelerometer data when the device movement is slow) and the magnetometer as the reference to magnetic north direction (assuming no magnetic disturbance). A generic formula for updating the state vector x with the reference data is shown below:

$$x_{k|k} = x_{k|k-1} + K_k y_k \quad \text{Equation 18}$$

The vector y is the correction term derived from the reference data z and the current state estimate x. There are many possible error metrics to derive the correction term y. In one embodiment the metric is the difference between z and fix, where fix is the projection of the state vector to the reference space. In one embodiment the projection is non-linear and can be represented as a function of x, i.e., H(x). The matrix K is the gain factor, which determines the contribution of the correction term to the state vector update. In one embodiment the gain factor is a fixed value. In another embodiment K is adaptive at every step k. Given the state update equation, the error covariance can also be updated by the reference data:

$$\begin{aligned} P_{k|k} &= \text{cov}(x_k - x_{k|k}) \quad \text{Equation 19}\\ &= \text{cov}(x_k - (x_{k|k-1} + K_k \cdot y_k))\\ &= \text{cov}((x_k - x_{k|k-1}) - K_k \cdot y_k) \end{aligned}$$

In one embodiment, if the correction term y is equal to z−Hx, the above equation becomes:

$$\begin{aligned} P_{k|k} &= \text{cov}((x_k - x_{k|k-1}) - K_k \cdot y_k) \quad \text{Equation 20}\\ &= \text{cov}((x_k - x_{k|k-1}) - K_k(z_k - H_k x_{k|k-1}))\\ &= \text{cov}((x_k - x_{k|k-1}) - K_k(z_k - H_k x_{k|k-1}))\\ &= \text{cov}((x_k - x_{k|k-1}) - K_k(z_k - H_k x_{k|k-1}))\\ &= \text{cov}((x_k - x_{k|k-1}) - K_k(H_k x_k + v_k - H_k x_{k|k-1}))\\ &= \text{cov}((I - K_k H_k)(x_k - x_{k|k-1})) - \text{cov}(K_k v_k)\\ P_{k|k} &= (I - K_k H_k) P_{k|k-1} (I - K_k H_k)^T - K_k R_k K_k^T \end{aligned}$$

where $v_k$ is the difference between the reference $z_k$ and the current estimate from the state vector. $R_k$ is the covariance of $v_k$. $P_{k|k-1}$ is the error covariance matrix obtained from gyroscope integration. The above equation updates P with the information from the reference data.

As mentioned in previous sections the "reference data" from accelerometer and magnetometer are easily skewed by sensor imperfection and external interference. To handle sensor imperfection, one embodiment would apply in-the-loop calibration algorithm by adding the accelerometer/magnetometer bias and/or scale factor into the state vector x. i.e. increase the dimension of the x vector from 6 to 12 or higher. The external interference can be detected by checking if the difference between the accelerometer/magnetometer data and the estimated value by the state vector (i.e. $v_k$) goes beyond the confidence interval. If the interference is detected, the system discards the current accelerometer/magnetometer data.

Confidence Interval Update with Out-of-Loop Accelerometer and Magnetometer Bias Calibration Algorithms For systems that uses out-of-loop accelerometer and magnetometer bias calibration algorithms, the confidence interval of system output can be estimated by running Monte Carlo test or particle filtering based on the probability distribution of the input data (indicated by its confidence interval).

Disturbance Case

During the magnetic disturbance, the magnetometer sensor cannot provide the heading reference to the system. The heading statistics is purely calculated from the gyroscope sensors.

When there is an no-motion case, the gyroscope bias is updated. With the new gyroscope bias update, the gyroscope bias random walk output can be reset to zero, i.e., the heading error bound will not grow. Only when the gyroscope bias update is stopped, the heading error bound will continue to grow.

When the heading error bound exceeds a specified threshold (for example 10 degrees), the heading accuracy value should be dropped to 0 from 3, to give user a warning about potential large heading error.

With a proper "figure 8" motion, the system will adapt to the magnetic disturbance by generating a new magnetometer bias estimation. Then, the system will recover to normal case.

Reduced Order Sub-Optimal Uncertainty Estimation

Mathematically, the uncertain variables can be modeled by random process with certain statistical properties (such as mean, standard deviation). With these statistical properties, it is possible to analyze (and estimate) the statistics of the uncertain signals in a stochastic dynamical systems.

Now we can treat all the sensor data as random variables with certain statistics (mean and standard deviation). The quaternion output of the gyroscope integration loop is the mean, while all the uncertainties are pushed to the error loops. Then it is sufficient to estimate the statistical property by working on the statistical properties of its error signal.

With this idea, it is possible to decouple and simplify the interaction between multiple states through cascaded error loops. The interaction between multiple states is included into the loop errors.

The 3-D altitude estimation system generates the output of the heading (yaw angle), pitch and roll angles. The estimation loop errors for these 3 states are illustrated in FIG. 3a. The heading statistics can be estimated through the outer loop error, while the pitch and roll statistics can be estimated through the inner loop error. The loop error will provide the uncertainty bound estimation.

In the inner feedback loop, the tilt error is compensated by the gravity reference from the accelerometer. As described in section 3, the heading error bound in the inner loop will grow over time if there is no out-of-loop calibration module compensating the gyroscope imperfection.

The outer feedback loop compensates the heading error caused by the magnetometer. However, since the magnetometer is served as reference in the outer feedback loop, the imperfectness of the magnetometer (e.g. bias error, magnetic interference, etc.) cannot be detected and compensated by its own feedback mechanism. Therefore, the magnetometer heading error estimation is classified into 2 cases, as shown in FIG. 4:

1) Magnetic field anomaly case: When the magnetic field disturbance is detected, the magnetometer data is not trustable. Therefore the outer feedback loop is opened. The heading estimate is basically from the inner feedback loop (tilt compensation from accelerometer). Gyroscope integration is the major contributor of the heading error in this case.
2) Normal case: The heading is estimated by the dual feedback loop. The gyroscope integration error is cancelled by the accelerometer and the magnetometer. The heading error mainly comes from the imperfection of accelerometer and magnetometer.

The magnetic disturbance can be detected by changes in magnetic field strength and direction. Possible embodiments for magnetic disturbance detection are using high pass filter or comparing the change rates between gyroscope and magnetometer.

Figure 4:
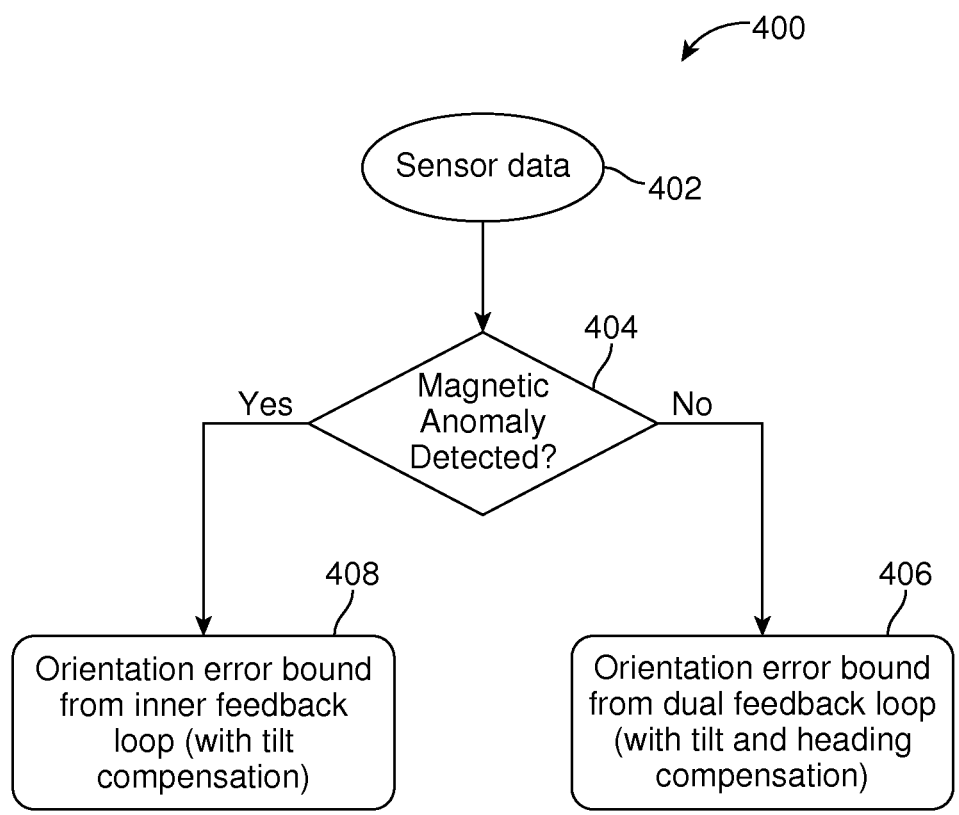
FIG. 4 shows a flow chart 400 of the steps performed by the system 300 in relation to magnetic anomaly detection by the block 316.

FIG. 4 shows a flow chart 400 of the steps performed by the system 300 in relation to magnetic anomaly detection by the block 316. In FIG. 4, at step 402, sensor data is input to the block 316. Next, at 404, if magnetic anomaly is detected, the process goes to the step 408 where the orientation error is bound from the inner feedback loop (with tilt compensation), otherwise, the process goes to the step 406. At the step 406, the orientation error is bound from dual feedback loop (with tilt and heading compensation).

Figure 5:
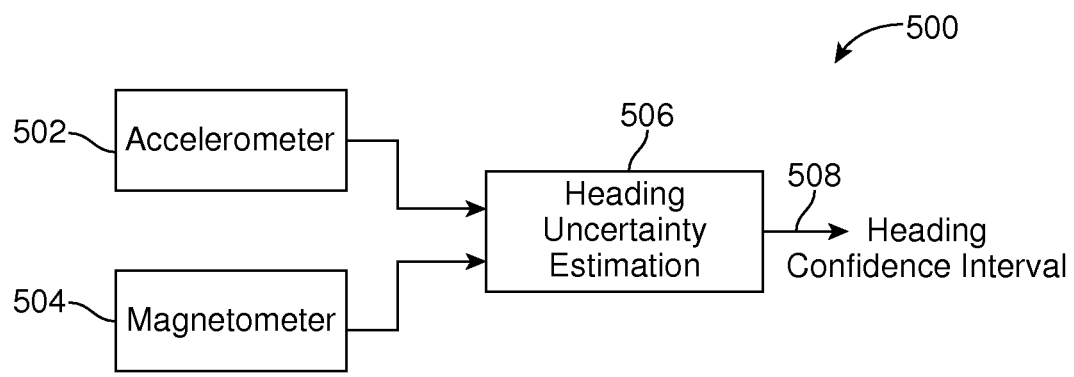
FIG. 5 shows a heading statistics calculation.

The heading statistics calculation procedure during normal case is depicted in FIG. 5. In FIG. 5, the output of the accelerometer sensor 502 and the magnetometer sensor 504 are shown to be used to calculate the heading uncertainty estimate at 506, which outputs the heading confidence interval 508, analogous to the output 362 of FIG. 3a. The accelerometer sensor 502 is analogous to the sensor 308 and the magnetometer sensor 504 is analogous to the magnetometer sensor 310.

Figure 6:
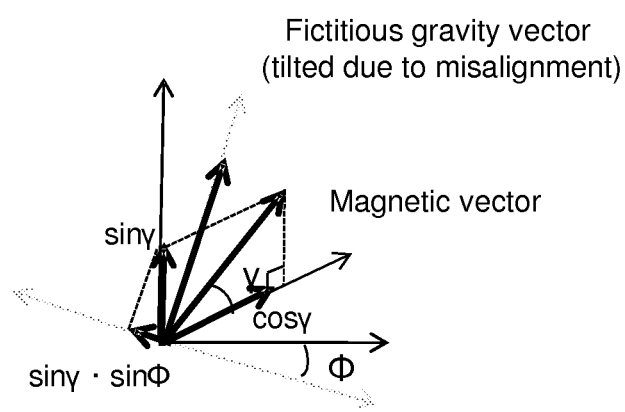
FIG. 6 shows the potential heading error caused by the accelerometer bias estimation error.

The heading error in normal case comes from two sources: in stationary condition, the heading error comes from the imperfection of the accelerometer and the magnetometer. For example, FIG. 6 shows the potential heading error caused by the accelerometer bias estimation error. The stationary heading error bound can be calculated by the confidence interval from the out-of-loop calibration algorithms, as follows.

$$\text{Heading Error} = \arctan\left(\frac{\sin\gamma \cdot \sin\varphi}{\cos\gamma}\right) \qquad \text{Equation 21}$$

In dynamic condition, the heading may undergo additional variation due to the interference of linear acceleration. One embodiment to estimate the heading error bound in dynamic condition is by calculating standard deviation of the inner product of the two 3D vectors formed by accelerometer data and magnetometer data:

$$\theta = a\cos\left(\frac{\langle Va, Vm \rangle}{|Va| \cdot |Vm|}\right) \qquad \text{Equation 22}$$

In stationary condition, θ should remain constant and the standard deviation is minimum.

Although the description has been described with respect to particular embodiments thereof, these particular embodiments are merely illustrative, and not restrictive.

As used in the description herein and throughout the claims that follow. "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

What we claim is:

1. An inertial measurement system comprising:
   an accelerometer processing unit including an accelerometer sensor configured to sense acceleration of a device in motion to generate raw accelerometer data, the accelerometer processing unit configured to calibrate the raw acceleration data to generate an accelerometer output;
   a magnetometer processing unit including a magnetometer sensor configured to sense magnetic field of the device in motion to generate raw magnetometer data, the magnetometer processing unit including a magnetometer calibration unit configured to calibrate the raw magnetometer data to generate a magnetometer output, wherein the raw magnetometer data and/or the raw accelerometer data include an angle error introduced by the magnetometer sensor and/or the accelerometer sensor, respectively;
   an operation unit configured to combine the accelerometer data and the accelerometer output and the magnetometer output to generate an operation output;
   a gyroscope processing unit including a gyroscope sensor, a gyroscope calibration unit, and a gyroscope integration unit, the gyroscope sensor configured to sense an angular velocity of the device in motion and generate raw angular velocity data, the gyroscope calibration unit configured to calibrate the raw angular velocity data and generate a calibrated angular velocity data, and the gyroscope integration unit configured to integrate the calibrated angular velocity data and generate a gyroscope output;
   a sensor fusion configured to combine the gyroscope output and the operation output and to perform a quaternion operation on the combined gyroscope and operation outputs to generate a quaternion output representative of an orientation of the device in motion, the orientation of the device in motion including the angle error and/or a confidence value used to calculate a confidence interval indicative of bounds of an angle and/or confidence value indicative of bounds of an angle uncertainty, the angle uncertainty representing a confidence in value of an angle estimation based on the angle error in the raw magnetometer data and/or raw accelerometer data.

2. The inertial measurement system of claim 1, wherein a smaller confidence in value indicates a higher reliability in the angle estimation and a larger confidence in value indicates a lower reliability in the angle estimation.

3. An inertial measurement system comprising:
   an accelerometer processing unit including an accelerometer sensor configured to sense a device in motion and generate raw acceleration data, the accelerometer sensor adding bias and noise to the raw acceleration data, the raw acceleration data with bias and noise defining an accelerometer output, the accelerometer processing unit further including a calibration and gravity extraction block responsive to the acceleration output and configured to calibrate the acceleration output and generate calibrated accelerometer data;
   a magnetometer processing unit including a magnetometer sensor configured to sense magnetic field, the magnetometer sensor adding bias and noise to the sensed magnetic field defining a magnetometer output, the magnetometer processing unit further including a magnetometer calibration unit responsive to the magnetometer output and configured to calibrate the magnetometer output to generate a calibrated magnetometer data;

an operation unit configured to combine the accelerometer output and the magnetometer output to generate an operation output;

a gyroscope processing unit including a gyroscope sensor, a gyroscope calibration unit, and a gyroscope integration unit, the gyroscope sensor adding bias and noise to an angular velocity of the device in motion, the gyroscope sensor configured to sense the angular velocity of the device in motion and generate raw angular velocity data, the angular velocity with the bias and noise defining a gyroscope output, the gyroscope calibration unit configured to calibrate the raw angular velocity data to generate a calibrated angular velocity data, and the gyroscope integration unit configured to integrate the calibrated angular velocity data to generate a gyroscope output;

a sensor fusion configured to combine the gyroscope output and the summer output and perform a quaternion operation to generate a quaternion output representing an orientation of the device in motion, the orientation of the device in motion including an angle and/or confidence value used to calculate a confidence interval indicative of bounds of an angle uncertainty, the angle uncertainty representing a confidence in a value of an angle uncertainty, the angle uncertainty representing a confidence in a value of an angle estimation of an error in the raw magnetometer data and/or raw accelerometer data based on the bias and noise of the magnetometer sensor and/or accelerometer sensor, respectively.

4. The inertial measurement system of claim 3, further including an inverse quaternion block responsive to the quaternion output and configured to perform inverse quaternion and to generate an inverse quaternion output, wherein the accelerometer calibration unit is responsive to the inverse quaternion output.

5. A method of estimating heading using an inertial measurement system comprising:

receiving raw accelerometer data including bias and noise from an accelerometer sensor sensing acceleration of a device in motion;

calibrating the received raw accelerometer data to generate a calibrated accelerometer data to generate accelerometer output;

receiving raw magnetometer data from a magnetometer sensor sensing magnetic field of the device in motion, the magnetometer sensor adding bias and noise to the magnetic field of the device in motion;

a magnetometer calibration unit calibrating the received raw magnetometer data to generate a magnetometer output;

performing an operation on the accelerometer output and the magnetometer output to generate an operation output, the operation output representative of an error in the raw magnetometer data and/or raw accelerometer data based on the bias and noise of the magnetometer sensor and/or the bias and noise of the accelerometer sensor, respectively;

a sensor fusion generating a quaternion output based on the operation output; performing inverse quaternion on the quaternion output to generate an inverse quaternion output; and generating a confidence interval in an orientation angle of the device in motion from the operation output, the confidence interval representing a value indicative of error bounds of the orientation angle of the device in motion.

6. The method of claim 5, further including calibrating a gyroscope data to generate a calibrated gyroscope output.

7. The method of 6, further including integrating the quaternion output and the calibrated gyroscope output.

* * * * *